United States Patent
Kim et al.

(10) Patent No.: US 10,332,680 B2
(45) Date of Patent: Jun. 25, 2019

(54) COMPOSITE ELECTRONIC COMPONENT

(71) Applicant: SAMSUNG ELECTRO-MECHANICS CO., LTD., Suwon-si, Gyeonggi-do (KR)

(72) Inventors: Ho Yoon Kim, Suwon-si (KR); Soo Hwan Son, Suwon-si (KR); Man Su Byun, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 163 days.

(21) Appl. No.: 15/274,528

(22) Filed: Sep. 23, 2016

(65) Prior Publication Data
US 2017/0236640 A1 Aug. 17, 2017

(30) Foreign Application Priority Data
Feb. 11, 2016 (KR) .................. 10-2016-0015747

(51) Int. Cl.
*H01C 1/06* (2006.01)
*H01C 7/00* (2006.01)
(Continued)

(52) U.S. Cl.
CPC .............. *H01G 2/14* (2013.01); *H01C 1/06* (2013.01); *H01C 7/008* (2013.01); *H01C 7/18* (2013.01);
(Continued)

(58) Field of Classification Search
CPC ... H01G 2/14; H01G 2/22; H01G 4/30; H01C 1/06; H01C 7/008; H01C 7/18; H01F 17/00; H01F 27/292; H01F 27/34; H01F 27/29
(Continued)

(56) References Cited

U.S. PATENT DOCUMENTS

2010/0157505 A1* 6/2010 Feichtinger .............. H01G 4/30
361/301.4
2013/0201585 A1* 8/2013 Ikeda ....................... H01T 4/12
361/56
2015/0340154 A1 11/2015 Kim et al.

FOREIGN PATENT DOCUMENTS

JP 2000-114005 A 4/2000
JP 2004-014437 A 1/2004
(Continued)

OTHER PUBLICATIONS

Machine Translation of Kato et al. Japanese Patent Document JP 2004-031016 A, Jan. 29, 2004.*
(Continued)

*Primary Examiner* — Kevin J Comber
(74) *Attorney, Agent, or Firm* — Morgan Lewis & Bockius LLP (57) ABSTRACT

A composite electronic component includes: a body part including a dielectric portion; first and second external electrodes disposed on outer surfaces of the body part; a plurality of first and second electrodes disposed inside of the dielectric portion, and electrically connected to the first and second external electrodes, respectively; third and fourth electrodes disposed on an upper portion of the dielectric portion, and electrically connected to the first and second external electrodes, respectively; a gap provided between the third and fourth electrodes; a groove disposed below the gap; and an electrostatic discharge (ESD) layer disposed in the gap.

10 Claims, 6 Drawing Sheets

(51) Int. Cl.
- *H01C 7/18* (2006.01)
- *H01G 2/14* (2006.01)
- *H01G 2/22* (2006.01)
- *H01G 4/30* (2006.01)
- *H01F 17/00* (2006.01)
- *H01F 27/29* (2006.01)

(52) U.S. Cl.
CPC ............. *H01G 2/22* (2013.01); *H01G 4/30* (2013.01); *H01F 17/00* (2013.01); *H01F 27/292* (2013.01)

(58) Field of Classification Search
USPC ........................................................ 361/220
See application file for complete search history.

(56) References Cited

FOREIGN PATENT DOCUMENTS

| | | | |
|---|---|---|---|
| JP | 2004-031016 A | | 1/2004 |
| JP | 2004014437 A | * | 1/2004 |
| JP | 2012-248326 A | | 12/2012 |
| KR | 10-2015-0089318 A | | 8/2015 |
| KR | 10-2015-0135909 A | | 12/2015 |

OTHER PUBLICATIONS

Machine Translation of Fujiwara et al. Japanese Patent Document JP 2004-14437 Jan. 15, 2004 (Year: 2004).*
Office Action Korean Patent Application No. 10-2016-0015747 dated Feb. 14, 2017 with full English translation.

* cited by examiner

COMPOSITE ELECTRONIC COMPONENT

CROSS-REFERENCE TO RELATED APPLICATION(S)

This application claims benefit of priority to Korean Patent Application No. 10-2016-0015747 filed on Feb. 11, 2016 in the Korean Intellectual Property Office, the disclosure of which is incorporated herein by reference in its entirety.

TECHNICAL FIELD

The present disclosure relates to a composite electronic component.

BACKGROUND

In the case of recent portable electronic devices, the formation of cases thereof from a metal having conductivity has tended to be increased. Thus, the need for the prevention of electrical defects inside and outside of electronic devices has increased.

In particular, for aesthetic purposes, strength improvements, and the like, cases in which entire external surfaces of portable electronic devices are manufactured using metal frames have increased. Thus, demand for means for protecting internal electronic components from external electrostatic discharge (ESD) or protecting users from electric shocks occurring due to internal short circuits has further increased.

However, as portable electronic devices have been miniaturized and have become highly integrated, separate ESD protection devices or electrical shock protection devices have become difficult to dispose therein.

SUMMARY

An aspect of the present disclosure provides a composite electronic component having an ESD protection portion and high resistance to static discharge.

According to an aspect of the present disclosure, a composite electronic component includes: a body part including a dielectric portion; first and second external electrodes disposed on outer surfaces of the body part; a plurality of first and second electrodes disposed inside of the dielectric portion, and electrically connected to the first and second external electrodes, respectively; third and fourth electrodes disposed on an upper portion of the dielectric portion, and electrically connected to the first and second external electrodes, respectively; a gap provided between the third and fourth electrodes; a groove disposed below the gap; and an electrostatic discharge (ESD) layer disposed in the gap.

According to an aspect of the present disclosure, a composite electronic component includes an electronic element portion and an ESD protection portion disposed on the electronic element portion. The ESD protection portion may include a first discharge electrode and a second discharge electrode disposed to have a gap therebetween, a groove disposed below the gap, and an ESD discharge layer disposed in the gap.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, embodiments of the present disclosure will be described with reference to the accompanying drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on, " "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises, " and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

An electronic element portion in the present disclosure may be a capacitor, an inductor, or a thermistor, but is not limited thereto.

However, in order to clearly describe exemplary embodiments in the present disclosure, a capacitor will be described below by way of example.

Figure 1:
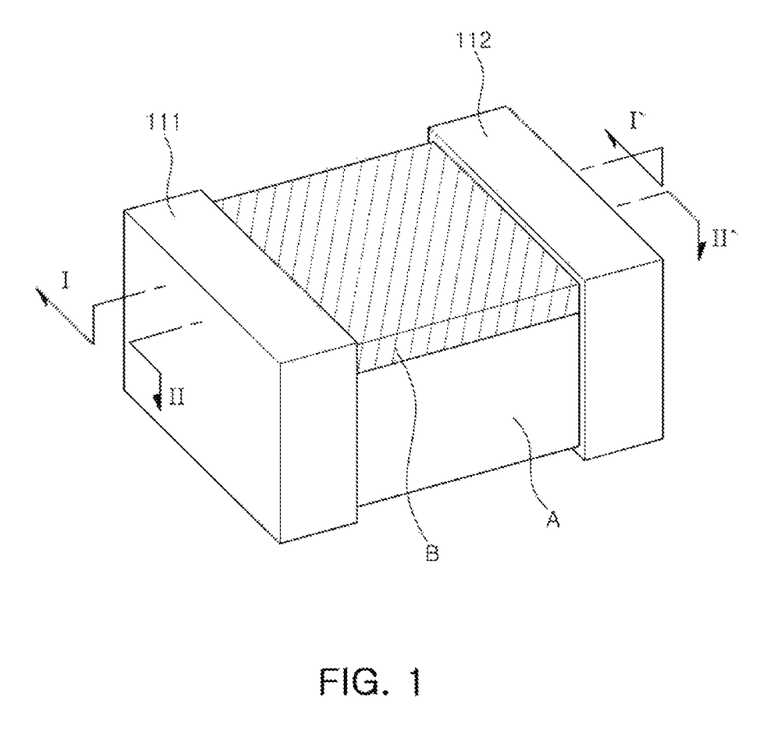
FIG. 1 is a schematic perspective view of a composite electronic component according to an exemplary embodiment.

FIG. 1 is a schematic perspective view of a composite electronic component according to an exemplary embodiment.

With reference to FIG. 1, a composite electronic component according to an exemplary embodiment may include a body part including an electronic element portion A and an electrostatic discharge (ESD) protection portion B, and first and second external electrodes 111 and 112 disposed on outer surfaces of the body part.

The first and second external electrodes 111 and 112 may be disposed on two end portions of the body part in a length direction thereof.

The first and second external electrodes 111 and 112 may include a plurality of metal layers.

For example, the first and second external electrodes 111 and 112 may include a first metal layer formed using a conductive paste including silver (Ag), nickel (Ni), or the like, and second and third metal layers formed using a plating method.

The first and second external electrodes 111 and 112 may be electrically connected to first and second electrodes and and may be electrically connected to third and fourth electrodes and, to be described later.

Figure 2:
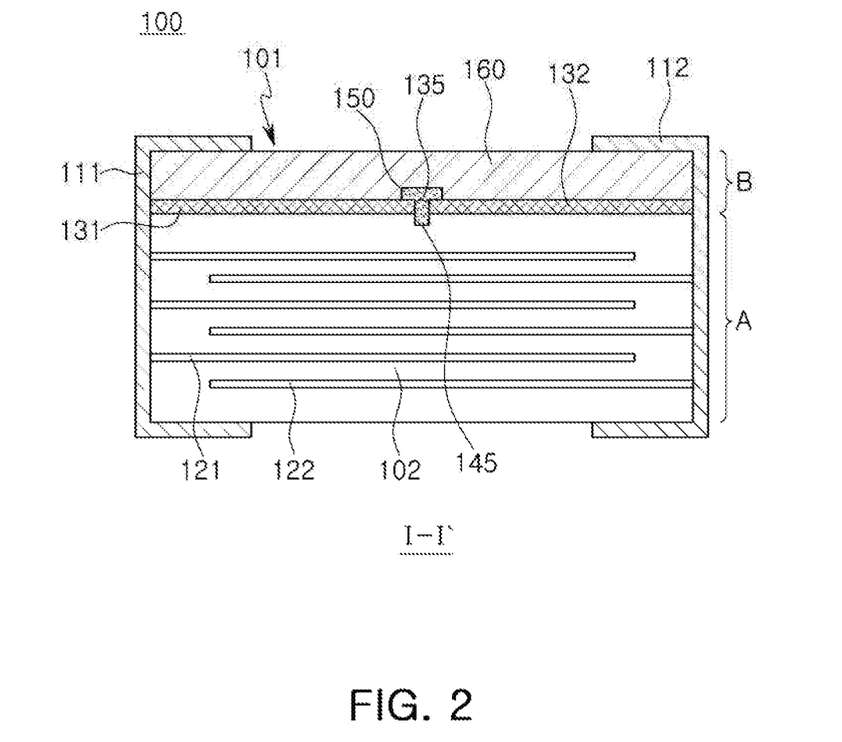
FIG. 2 is a schematic cross-sectional view of a composite electronic component, taken along line I-I' of FIG. 1, according to a first exemplary embodiment.

FIG. 2 is a schematic cross-sectional view of a composite electronic component, taken along line I-I' of FIG. 1, according to a first exemplary embodiment.

With reference to FIG. 2, the composite electronic component 100 according to the first exemplary embodiment may include the electronic element portion A and the ESD protection portion B.

The electronic element portion A may include a dielectric portion 102, and the first and second electrodes 121 and 122 disposed in the dielectric portion 102.

The dielectric portion 102 may be formed by laminating, pressing and sintering a plurality of dielectric layers including a ferroelectric material, and respective layers of the dielectric portion 102 may be integrated with each other such that a boundary therebetween may not be readily discerned without the use of a scanning electron microscope (SEM).

A dielectric layer may be formed using a material having a perovskite structure, for example, a material such as $BaTiO_3$, a ferroelectric material. In a different manner, for example, when the electronic element portion A is an inductor, a magnetic material may be used, and when the electronic element portion A is a thermistor, a material having characteristics that a resistive degree is changed according to temperature may be used.

A plurality of the first and second electrodes 121 and 122 may be disposed in an inner portion of the dielectric portion 102.

The first and second electrodes 121 and 122 may be formed by printing a conductive paste including a conductive material onto a dielectric layer. In a different manner, in the case of an inductor, the first and second electrodes may be electrodes having a coil form.

As a conductive material of the first and second electrodes 121 and 122, one selected from nickel (Ni), copper (Cu), silver (Ag), and the like may be used, but the conductive material is not limited thereto.

The ESD protection portion B may be disposed on one surface of the electronic element portion A, for example, on an upper surface of the electronic element portion A.

The ESD protection portion B may include an ESD discharge layer 150, a cover layer 160, a third electrode 131, and a fourth electrode 132.

The third electrode 131 refers to a first discharge electrode, and the fourth electrode 132 refers to a second discharge electrode 132.

The third and fourth electrodes 131 and 132 may be formed through printing a conductive paste including Ag or Cu.

However, in a case in which the third and fourth electrodes are formed using a conductive paste, since the third and fourth electrodes 131 and 132 may be damaged at a high temperature of 700° C. or higher, during a sintering process in manufacturing the composite electronic component 100, the third and fourth electrodes 131 and 132 may be formed using an Ag-epoxy or a Cu-epoxy. The Ag-epoxy or Cu-epoxy refers to an epoxy resin including a conductive powder corresponding thereto.

A gap 135 may be disposed between the third and fourth electrodes 131 and 132 to separate the third and fourth electrodes from each other.

The gap 135 may be formed by forming a conductive pattern having a linear shape, using one of a conductive paste, an Ag-epoxy or a Cu-epoxy, and then, by removing a central portion of the conductive pattern using laser processing so as to be divided into the third and fourth electrodes 131 and 132.

Thus, the third and fourth electrodes 131 and 132 may be provided in a form in which end portions thereof facing each other are parallel to each other.

The groove 145 may be disposed below the gap 135.

The groove 145 may be formed during the formation of the gap 135, by controlling an irradiation duration of a laser beam or laser beam intensity, during the process of forming the gap 135 using laser processing.

The ESD discharge layer 150 may be disposed in the gap 135.

The ESD discharge layer 150 may be formed using a paste for ESD, obtained by mixing metal particles, for example, of at least one of Ag, Cu, Ni and palladium (Pd), and at least one ceramic material between $SiO_2$ or ZnO with each other.

The ESD discharge layer 150 has insulating characteristics below a limit voltage, but in a case in which a voltage higher than the limit voltage is applied thereto, a current may flow along with metal particles included in the ESD discharge layer 150.

The limit voltage may be adjusted by controlling a content of metal particles included in the ESD discharge layer 150.

In detail, for example, when the ESD discharge layer 150 is disposed in the gap 135, and in a case in which static electricity or an overvoltage having a level higher than a limit voltage is applied thereto, the electronic element portion A may be prevented from being damaged due to a current flowing between the third and fourth electrodes 131 and 132 and static electricity or an overvoltage applied to the electronic element portion A.

In order to improve resistance or sensitivity characteristics to static electricity or an overvoltage, a width of the gap 135 is reduced, and in this case, as the width of the gap 135 is reduced, a problem in which an ESD paste is not distributed uniformly in the gap 135 may occur.

For example, in a case in which static electricity or an overvoltage is applied, a current flows to the third and fourth electrodes 131 and 132 through the ESD discharge layer 150. In this case, however, in a case in which the ESD discharge layer 150 is not formed in the gap 135 uniformly, a current may only partially flow without a uniform flow of current.

In the case in which a current having an excessive degree of voltage only flows to a portion of the third electrode 131, the fourth electrode 132, or the ESD discharge layer 150, a problem in which a portion of the third electrode 131, the fourth electrode 132, or the ESD discharge layer 150 is damaged my occur due to overheating or an electric discharge therein. Furthermore, the electronic element portion A in contact with the ESD protection portion B may be damaged, and conductive foreign substances and the like may flow into the electronic element portion A through the damaged portion. Thus, reliability of the electronic element portion A may be reduced.

For example, in a case in which a phenomenon in which a static discharge or an overvoltage only flows to a portion of the third electrode 131, the fourth electrode 132, or the ESD discharge layer 150 occurs once, the third electrode 131, the fourth electrode 132, or the ESD discharge layer 150 may have resistance to the static electricity or the overvoltage, but in a case in which the phenomenon occurs a plurality of times, repetitively, the third electrode 131, the fourth electrode 132, or the ESD discharge layer 150 may be damaged.

In detail, capability in which the third electrode 131, the fourth electrode 132, or the ESD discharge layer 150 may withstand a static discharge or an overvoltage a plurality of times may be durability, and the durability needs to be improved.

In the case of the composite electronic component 100 according to an exemplary embodiment, since the groove 135 is disposed below the gap 135, the ESD discharge layer 150 may be uniformly disposed in the gap 135. Thus, the composite electronic component 100 according to an exemplary embodiment has improved resistance to a static discharge or an overvoltage, and a phenomenon in which a static discharge or an overvoltage only partially flows may be prevented. Thus, the composite electronic component 100 according to an exemplary embodiment may be prevented from being damaged or the electronic element portion A may be prevented from being damaged. Reliability of the composite electronic component 100 may be improved.

In detail, the ESD paste used for the formation of the ESD discharge layer 150 is a fluid having viscosity, and thus, the groove 135 may induce a capillary phenomenon in the fluid, such that the ESD discharge layer 150 may be uniformly disposed in the gap 135.

In detail, the groove 135 may have a width able to induce the capillary phenomenon, and a width of the groove 135 may be changed depending of the viscosity of the ESD paste.

A cover layer 160 may be disposed on the third and fourth electrodes 131 and 132.

The cover layer 160 may serve to protect the ESD protection portion B.

Figure 3:
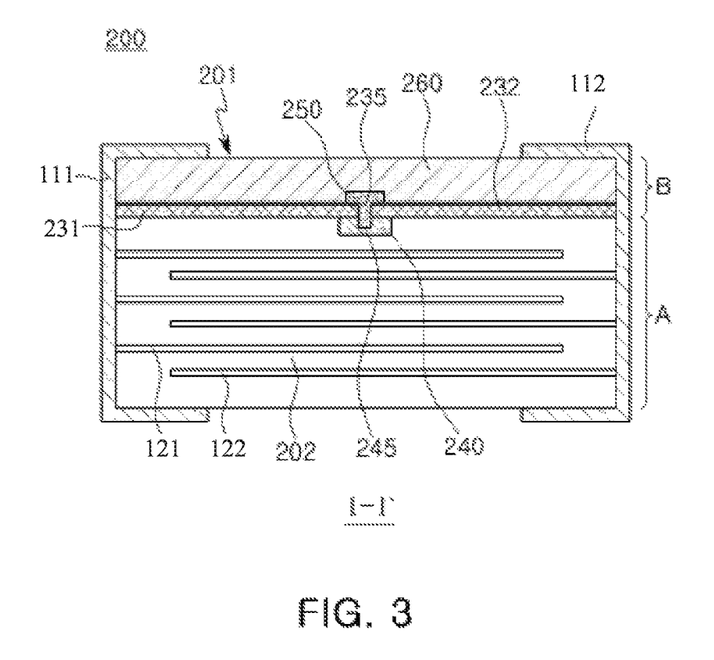
FIG. 3 is a schematic cross-sectional view of a composite electronic component, taken along line I-I' of FIG. 1, according to a second exemplary embodiment.

FIG. 3 is a schematic cross-sectional view of a composite electronic component, taken along line I-I' of FIG. 1, according to a second exemplary embodiment.

Hereinafter, descriptions of a second exemplary embodiment and other exemplary embodiments overlapping the description of the first exemplary embodiment will be omitted.

A composite electronic component 200 according to a second exemplary embodiment may include a body part 201 including an electronic element portion A and an electrostatic discharge (ESD) protection portion B, and may further include a protective layer 240 as compared to the first exemplary embodiment.

With reference to FIG. 3, the protective layer 240 may be disposed in an upper portion of a dielectric portion 202, for example, between third and fourth electrodes 231 and 232 and the dielectric portion 202. Thus, the protective layer 240 may be disposed between an electronic element portion A and an ESD protection portion B.

The protective layer 240 may be formed using an epoxy resin. For example, when the third and fourth electrodes 231 and 232 are formed of an Ag-epoxy or a Cu-epoxy, the protective layer 240 may be formed using an epoxy resin to improve adhesive properties, and thus, delamination thereof may be prevented.

In this case, a groove 245 may be formed in the protective layer 240. As described above in the first exemplary embodiment, the groove 245 may serve to induce the ESD discharge layer 250 to be uniformly disposed in the gap 235.

As illustrated in FIG. 2, for example, when the groove 145 is formed in one surface of the dielectric portion 102, the groove 145 may become a portion in which stress is concentrated. Thus, in this case, a possibility that the groove will become an initiation point of cracks exists.

However, in the case of the composite electronic component 200 according to the second exemplary embodiment, since the groove 245 is formed in the protective layer 240, the electronic element portion A may be prevented from having cracks occurring therein or the propagation of cracks.

In addition, the protective layer 240 may serve to prevent the dielectric portion 202 from being damaged due to a laser beam when the gap 235 is formed using laser processing.

A depth of the groove 245 may be within a range of 10% to 50% of a thickness of the protective layer 240. In a case in which the depth of the groove 245 is less than 10% of the thickness of the protective layer 240, an effect in which the ESD discharge layer 250 is uniformly disposed in the gap 235 may be reduced. In a case in which the depth of the groove 245 is greater than 50% of the thickness of the protective layer 240, the propagation of cracks to the electronic element portion A in the case of the application of external force to the composite electronic component 200 may not be prevented by the protective layer.

Thus, in order to improve durability of the ESD protection portion B while maintaining reliability of the electronic element portion A, the depth of the groove 245 may be within a range of 10% to 50% of the thickness of the protective layer 240.

Figure 4:
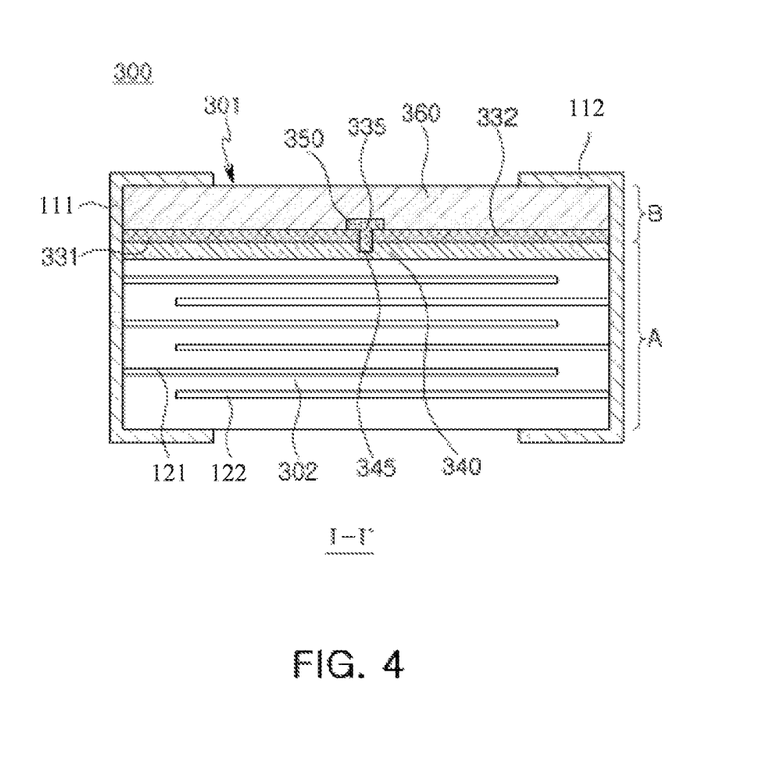
FIG. 4 is a schematic cross-sectional view of a composite electronic component, taken along line I-I' of FIG. 1, according to a third exemplary embodiment.

FIG. 4 is a schematic cross-sectional view of a composite electronic component, taken along line I-I' of FIG. 1, according to a third exemplary embodiment.

With reference to FIG. 4, a composite electronic component 300 according to a third exemplary embodiment may include a body part 301. A protective layer 340 of a composite electronic component 300 according to the third exemplary embodiment may be disposed to cover the entirety of one surface of a dielectric portion 302. For example, the protective layer 340 may be disposed to cover the entirety of an upper surface of the dielectric portion 302.

In a case in which a current having an excessive degree of voltage only flows to a portion of a third electrode 331, a fourth electrode 332, or an ESD discharge layer 350, a problem in which a portion of the third electrode 331, the fourth electrode 332, or the ESD discharge layer 350 is damaged my occur due to overheating or an electric discharge therein. Furthermore, since an electronic element portion A in contact with an ESD protection portion B is damaged and conductive foreign substances and the like flow into the electronic element portion A through the damaged portion, reliability of the electronic element portion A may be reduced.

However, in the case of the composite electronic component 300 according to the third exemplary embodiment, since the protective layer 340 is disposed to cover one surface of the dielectric portion 302, for example, an upper surface of the device portion A, the electronic element portion A in contact with the ESD protection portion B may be prevented from being damaged due to overheating or an electrical discharge. Thus, reliability of the composite electronic component 300 may be improved. Similar to the first embodiment, a groove 345 may serve to induce the ESD discharge layer 350 to be uniformly disposed in a gap 335, and a cover layer 360 may be disposed on the third and fourth electrodes 331 and 332 to protect the ESD protection portion B.

Figure 5:
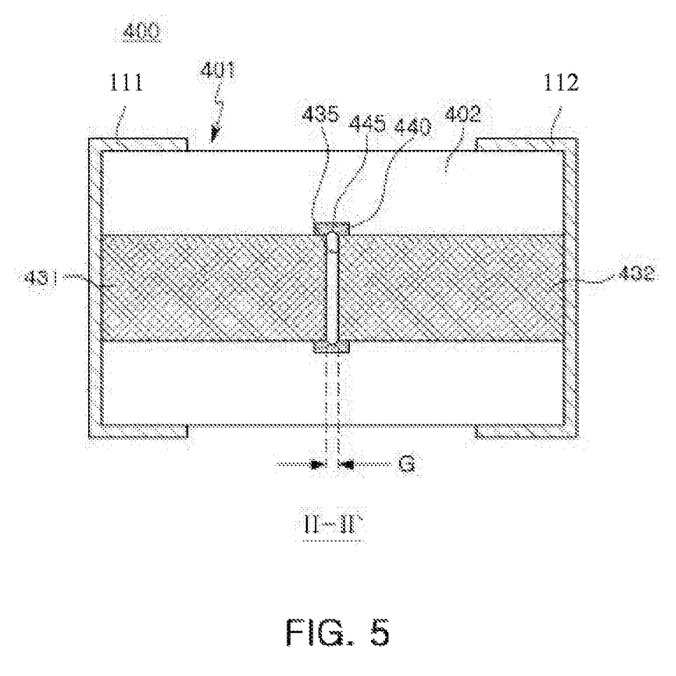
FIG. 5 is a schematic plan view of a composite electronic component, taken along line II-II' of FIG. 1, illustrating a layer on which first and second discharge electrodes are disposed, according to a fourth exemplary embodiment.

FIG. 5 is a schematic plan view of a composite electronic component, taken along line II-II' of FIG. 1, illustrating a layer on which first and second discharge electrodes are disposed, according to a fourth exemplary embodiment.

FIG. 5 illustrates a modified example of the second exemplary embodiment, but the exemplary embodiment is not limited thereto, and may also be applied to the first to third exemplary embodiments.

With reference to FIG. 5, a composite electronic component 400 according to a fourth exemplary embodiment may include a body part 401. A gap having a linear form may be disposed between a third electrode 431 and a fourth electrode 432 of the composite electronic component 400 according to a fourth exemplary embodiment.

A width G of the gap 435 may be within a range of 1 μm to 23 μm.

In addition, in the case of the composite electronic component 400 according to the fourth exemplary embodiment, a variation in the width G of the gap 435 is less than 1%.

In the case of the gap 435 of the composite electronic component 400 according to the fourth exemplary embodiment, as the gap 435 is formed using laser processing after one conductive pattern is formed such that one conductive pattern is divided into third and fourth electrodes 431 and 432 formed on a dielectric layer 402, the third and fourth electrodes 431 and 432 may be parallel to each other centered on the gap 435. In this case, a variation in the width G of the gap 435 may be less than 1% of the width G of the gap 435.

In a case in which the width G of the gap 435 is not constant, a current having a static discharge or an overvoltage may flow to a portion in which the width G of the gap 435 is relatively narrow. Thus, the portion to which current having a static discharge or an overvoltage has flowed may be broken due to overheating or an electrical discharge.

However, the gap 435 of the composite electric component 400 according to the fourth exemplary embodiment has a variation less than 1% of the width G of the gap 435, and thus, has positive characteristics of high electricity resistance to a static discharge or an overvoltage. In addition, a groove 445 may be formed during formation of the gap 435. A protection layer 440 may fill in the groove 445.

Figure 6:
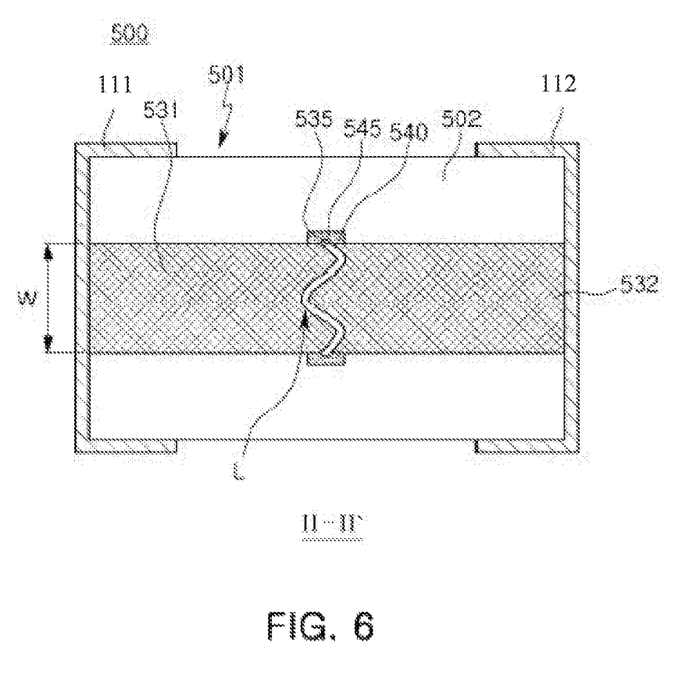
FIG. 6 is a schematic plan view of a composite electronic component, taken along line II-II' of FIG. 1, illustrating a layer on which first and second discharge electrodes are disposed, according to a fifth exemplary embodiment.

FIG. 6 is a schematic plan view of a composite electronic component, taken along line II-II' of FIG. 1, illustrating a layer on which first and second discharge electrodes are disposed, according to a fifth exemplary embodiment.

FIG. 6, similar to FIG. 5, illustrates a modified example of the second exemplary embodiment, but the exemplary embodiments illustrated in FIGS. 5 and 6 are not limited thereto, and may also be applied to the first to third exemplary embodiments.

With reference to FIG. 6, a composite electronic component 500 according to a fifth exemplary embodiment may include a body part 501. A gap 535 of the composite electronic component 500 according to the fifth exemplary embodiment may have a curved form rather than a linear form.

For example, the gap 535 may have a wave-shaped pattern as illustrated in FIG. 6, but is not limited thereto.

A length L of the gap 535 of the composite electronic component 500 according to the fifth exemplary embodiment may be greater than a width W of a third electrode 531 or a fourth electrode 532 formed on a dielectric layer 502.

In a manner similar to the fourth exemplary embodiment, the width G of the gap 535 is constant and the length L of the gap 535 is greater than the width W of the third electrode 531 or the fourth electrode 532, to thus prevent a static discharge or an overvoltage from flowing to any constant portion and further allow for an increase in an area in which a static discharge or an overvoltage may flow. In addition, a groove 545 maybe formed during formation of the gap 535. A protection layer 540 may fill in the groove 545.

Thus, overcurrent may be prevented from flowing to a local portion of an ESD discharge layer. Whereby, electrical resistance of an ESD discharge layer may be improved.

As set forth above, according to exemplary embodiments, a composite electronic component includes an ESD protection portion, and an ESD discharge layer is uniformly disposed between first and second discharge electrodes. Thus, an ESD protection portion may have improved resistance to static electricity.

In addition, since a width of a gap between first and second discharge electrodes is constant, in a case in which static electricity occurs, a current may be prevented from being concentrated. Whereby, an ESD protection portion may have improved resistance to static electricity.

While embodiments have been shown and described above, it will be apparent to those skilled in the art that modifications and variations could be made without departing from the scope of the present disclosure as defined by the appended claims.

What is claimed is:

1. A composite electronic component comprising:
   a body part including a dielectric portion;
   first and second external electrodes disposed on outer surfaces of the body part;
   a plurality of first and second electrodes disposed inside of the dielectric portion, and electrically connected to the first and second external electrodes, respectively;
   third and fourth electrodes disposed on an upper portion of the dielectric portion, and electrically connected to the first and second external electrodes, respectively;
   a gap provided between the third and fourth electrodes;
   a groove disposed below the gap; and
   an electrostatic discharge (ESD) layer disposed in the gap, wherein a space in the groove is filled with the ESD layer, and
   wherein the composite electronic component further comprises a protective layer disposed to cover an entirety of an upper surface of the dielectric portion, the protective layer being made of an epoxy resin and having the groove formed at an upper surface thereof, the protective layer being in contact with the ESD layer.

2. The composite electronic component of claim 1, wherein a depth of the groove is within a range of 10% to 50% of a thickness of the protective layer.

3. The composite electronic component of claim 1, wherein a length of the gap is greater than a width of each of the third electrode and the fourth electrode.

4. The composite electronic component of claim 1, wherein a variation in a width of the gap is less than 1% of the width of the gap.

5. The composite electronic component of claim 1, wherein the groove has a width inducing a capillary phenomenon in an ESD paste for forming the ESD discharge layer.

6. The composite electronic component of claim 1, wherein the groove and the gap are formed using laser processing.

7. The composite electronic component of claim 1, wherein end portions of the third and fourth electrodes facing each other are parallel to each other.

8. A composite electronic component comprising:
   an electronic element portion having a dielectric portion and an ESD protection portion disposed on the electronic element portion,
   wherein the ESD protection portion includes:
      a first discharge electrode and a second discharge electrode disposed to have a gap therebetween;
      a groove disposed below the gap; and
      an ESD layer disposed in the gap,
   wherein a space in the groove is filled with the ESD layer, and
   wherein the composite electronic component further comprises a protective layer disposed between the electronic element portion and the ESD protection portion to cover an entirety of an upper surface of the dielectric portion, the protective layer being made of an epoxy resin and having the groove formed at an upper surface thereof, the protective layer being in contact with the ESD layer.

9. The composite electronic component of claim 8, wherein the electronic element portion is a capacitor, an inductor, or a thermistor.

10. The composite electronic component of claim 8, wherein end portions of the first and second discharge electrodes facing each other are parallel to each other.

* * * * *